UNITED STATES PATENT OFFICE.

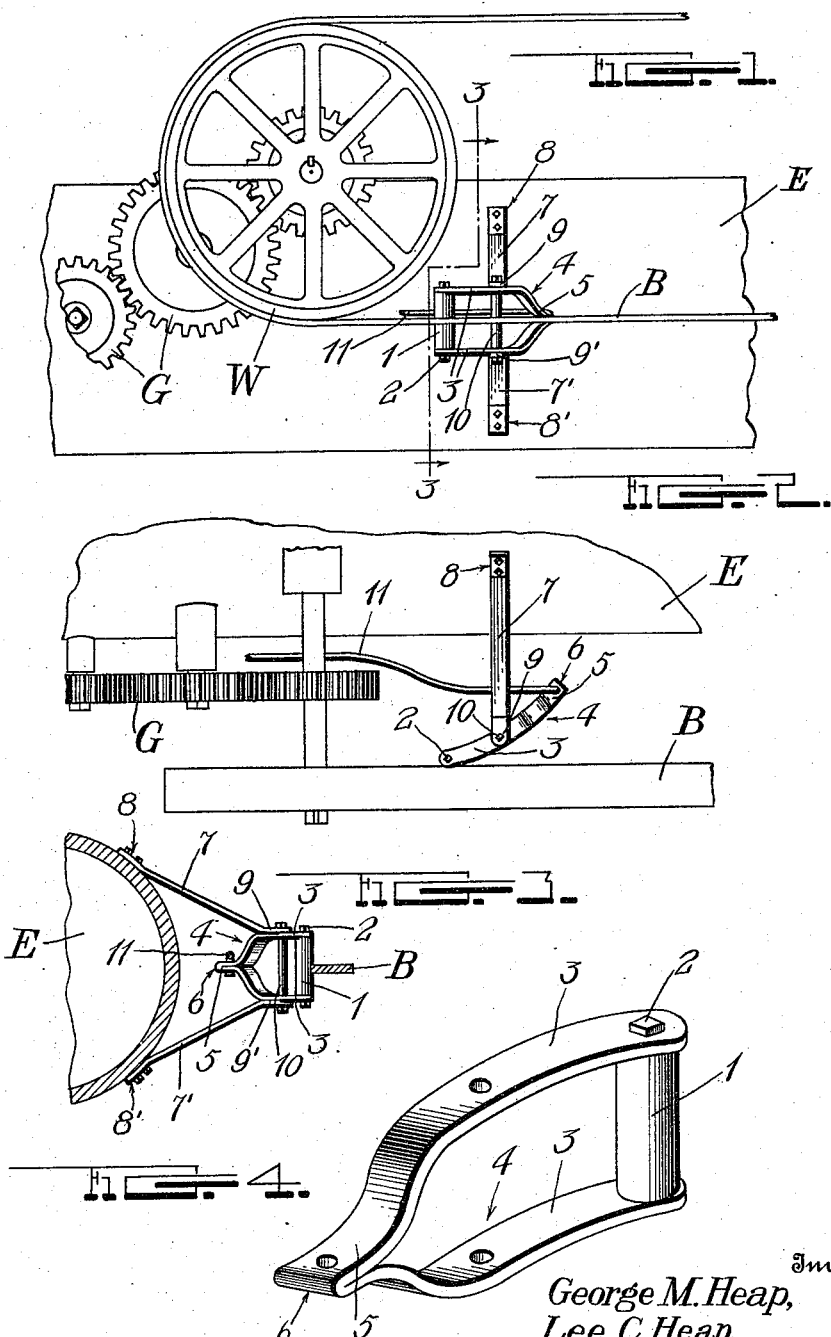

GEORGE M. HEAP, LEE C. HEAP, AND GEORGE A. WOODLEY, OF BERGEN, NORTH DAKOTA.

BELT-SHIFTER.

1,184,179. Specification of Letters Patent. Patented May 23, 1916.

Application filed September 28, 1914. Serial No. 863,941.

*To all whom it may concern:*

Be it known that we, GEORGE M. HEAP, LEE C. HEAP, and GEORGE A. WOODLEY, citizens of the United States, residing at Bergen, in the county of McHenry and State of North Dakota, have invented certain new and useful Improvements in Belt-Shifters; and we do declare the following to be a full, clear, and exact description of the invention, such as will enable others skilled in the art to which it appertains to make and use the same.

Our invention relates broadly to improvements in belt shifters and more particularly to those designed for use in connection with traction engines.

It is a well known fact that most forms of traction engines are equipped with gearing adjacent the inner side of the fly wheel and that a belt passing around said wheel often slips therefrom and becomes entangled in the gearing thus causing unnecessary mutilation of the belt.

It is to prevent such an occurrence, that we have provided the extremely simple construction herein described and claimed and shown in the drawings wherein:—

Figure 1 is a side elevation of a portion of a traction engine equipped with our invention; Fig. 2 is a top plan view thereof; Fig. 3 is a vertical transverse section as seen on the line 3—3 of Fig. 1. Fig. 4 is a perspective view of the lever.

In the accompanying drawings, we have shown a portion of a traction engine E which is equipped with the usual fly wheel W and gearing G whereby power may be transmitted to its drive wheels (not shown). Passing around the fly wheel W, and leading forwardly therefrom is the usual belt B which is designed for the running of other machines. As hereinbefore suggested, the belt B is prone to slip from the wheel and become entangled in the gears G, this occurrence having a number of disadvantageous features.

In order to retain the belt B properly in its position upon the wheel W, we have provided an upright roller 1 which is revolubly mounted upon an upright bolt 2, said bolt passing through the two arms 3 of a forked lever 4, the shank 5 of said lever as well as the arms 3 thereof being formed of a single metal bar which is bent upon itself as seen at 6 while its two halves curve respectively upwardly and downwardly and then continue in parallel relation to form the arms 3. Located above and below the intermediate portions of the arms 3, are upper and lower attaching brackets 7 and 7′, said brackets having their inner ends curved respectively upwardly and downwardly as seen at 8 and 8′, this being done to facilitate the attachment of said bracket to the boiler of the engine E, while their outer ends are bent as seen at 9 and 9′, to cause the same to lie in horizontal planes in contact with the arms 3, an upright pivot bolt 10 being passed through said arms and through the portions 9.

The device, as above described, is positioned in advance of the fly wheel W with its roller 1 contacting with the inner edge of the belt B, thereby preventing said belt from moving inwardly. It will be noted that when the parts stand in this position, the arms 3 lie substantially parallel with the belt B and that due to the formation of said arms, the same being curved throughout their lengths, the shank 5 is spaced inwardly from said belt. Pivotally connected to the shank 5 and projecting rearwardly to a suitable point, at which point an appropriate lever (not shown) may be provided, is an operating rod or link 11, which, when pulled rearwardly, will rock the forked lever around its pivot thereby forcing the roller outwardly to shift the belt to such an extent as to cause the same to fall from the wheel W.

We are aware that numerous other forms of belt shifters have been employed for the purpose of shifting the belt from one position to another but are not aware that a shifter of the specific formation herein described and claimed has been employed. This specific type operates to great advantage in spite of its simplicity. Particular emphasis is laid upon the fact that the bend of the upper arm 3 serves not only to space said arm above the shank 5 the necessary amount, but acts as a stop for contact with the operating rod 11 when the device is moved to inoperative position. Thus, the lever cannot reach dead center and will be readily operable at all times. Similarly, the bend in the lowermost arm 3 would serve as such a stop if the rod 11 were pivoted beneath the shank 5 rather than above the same.

Having thus described our invention what we claim is:

A belt shifter comprising a horizontally swinging lever formed of a single metal bar bent upon itself on a central transverse line, the two halves of said bar being disposed in contact immediately adjacent the bend to form a shank, said halves being then bent away from each other and continuing in parallel relation to their free ends, an upright roller between said free ends, an upright bolt connecting said ends and serving as an axis for the roller, upper and lower bracket members contacting respectively with the upper and lower parallel portions of the two halves of the bar, an upright fulcrum bolt passed through said portions and through said bracket members, and an operating rod pivoted to the aforesaid shank whereby to swing the lever around the fulcrum bolt at will and to also contact with the bend in one half of the bar to prevent the lever from reaching dead center when moved to inactive position.

In testimony whereof we have hereunto set our hands in presence of two subscribing witnesses.

GEORGE M. HEAP.
LEE C. HEAP.
GEORGE A. WOODLEY.

Witnesses:
O. P. HELSETH,
F. DIETZMAN.

Copies of this patent may be obtained for five cents each, by addressing the "Commissioner of Patents, Washington, D. C."